US011970371B2

(12) United States Patent
Assfalg et al.

(10) Patent No.: US 11,970,371 B2
(45) Date of Patent: Apr. 30, 2024

(54) CRANE AND CABLE DRUM UNIT FOR SAME

(71) Applicant: Liebherr-Werk Biberach GmbH, Biberach an der Riss (DE)

(72) Inventors: Martin Assfalg, Attenweiler (DE); Michael Altmann, Weingarten (DE); Michael Eggert, Biberach an der Riss (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 169 days.

(21) Appl. No.: 17/447,139

(22) Filed: Sep. 8, 2021

(65) Prior Publication Data

US 2022/0055870 A1 Feb. 24, 2022

Related U.S. Application Data

(63) Continuation of application No. PCT/EP2020/055871, filed on Mar. 5, 2020.

(30) Foreign Application Priority Data

Mar. 8, 2019 (DE) ..................... 10 2019 105 971.2

(51) Int. Cl.
*B66C 13/12* (2006.01)
*B65H 75/40* (2006.01)
(Continued)

(52) U.S. Cl.
CPC ........... *B66C 13/12* (2013.01); *B65H 75/403* (2013.01); *B65H 75/4497* (2013.01); (Continued)

(58) Field of Classification Search
CPC ....... B66C 13/12; B66C 23/26; B66C 23/365; B66C 23/62; B66C 23/16; B65H 75/364;
(Continued)

(56) References Cited

U.S. PATENT DOCUMENTS 3,061,233 A * 10/1962 Dudley ................. E21F 13/025 242/390.5
4,108,264 A * 8/1978 Tanaka ............... B65H 75/4486 191/12.2 A (Continued)

FOREIGN PATENT DOCUMENTS

CN 204079129 U * 1/2015
CN 107310977 A * 11/2017

(Continued)

*Primary Examiner* — Michael R Mansen
*Assistant Examiner* — Henrix Soto
(74) *Attorney, Agent, or Firm* — Levine Bagade Han LLP

(57) ABSTRACT

A crane (2), more particularly a mobile fast-erecting crane, having at least one supply connection to which a supply line (16), more particularly a power cable, can be connected, wherein the supply line can be wound on a cable drum (15), which can be mounted on a drum mount (10) on the crane, with the cable drum being mounted to rotate on a drum support frame (18), which has running gear (18) for moving the cable drum over the ground and which has releasable mounting means, shaped to match the drum mount of the crane, for separably mounting the drum support frame on the drum mount of the crane. The invention further relates to a cable drum unit for winding a supply line (16) of a crane (2).

19 Claims, 5 Drawing Sheets

(51) Int. Cl.
*B65H 75/44* (2006.01)
*B66C 23/26* (2006.01)
*B66C 23/36* (2006.01)

(52) U.S. Cl.
CPC ............ *B66C 23/26* (2013.01); *B66C 23/365* (2013.01); *B66C 2700/0371* (2013.01)

(58) Field of Classification Search
CPC .... B65H 75/42; B65H 75/403; B65H 75/425; B65H 75/4423; B65H 75/4492; B65H 75/4494; B65H 75/4497; B65H 75/28; B65H 75/40; B65H 2701/34
USPC .......................................................... 212/175
See application file for complete search history.

(56) References Cited

U.S. PATENT DOCUMENTS

| | | | | |
|---|---|---|---|---|
| 4,119,272 | A * | 10/1978 | Tidwell | A01G 25/095 239/737 |
| 4,457,527 | A * | 7/1984 | Lowery | B65H 49/32 182/20 |
| 4,512,361 | A * | 4/1985 | Tisbo | B65H 75/4465 137/355.27 |
| 4,587,383 | A * | 5/1986 | Stoldt | B60M 7/00 254/277 |
| 9,698,586 | B2 * | 7/2017 | Tojima | B60L 9/00 |
| 10,221,037 | B1 * | 3/2019 | Blasbalg | B65D 25/2802 |
| 2008/0128543 | A1 | 6/2008 | Rumczikas et al. | |

FOREIGN PATENT DOCUMENTS

| | | | | |
|---|---|---|---|---|
| DE | 3310311 | | 9/1984 | |
| DE | 9210081 | | 11/1992 | |
| DE | 202008003913 | | 8/2008 | |
| DE | 102009046327 | | 5/2011 | |
| DE | 202013104100 | | 11/2013 | |
| DE | 102015016279 | A1 * | 6/2016 | B66C 23/32 |
| DE | 202018100059 | U1 * | 2/2018 | B66C 13/20 |
| EP | 1081088 | A1 * | 3/2001 | B66F 9/061 |
| GB | 1280107 | | 7/1972 | |
| JP | H04 7293 | | 1/1992 | |
| JP | H06144784 | A * | 5/1994 | |
| JP | 2001026392 | A * | 1/2001 | |
| JP | 2018-135166 | | 8/2018 | |
| WO | WO 2020/182617 | | 9/2020 | |

* cited by examiner

CRANE AND CABLE DRUM UNIT FOR SAME

CROSS-REFERENCE TO RELATED APPLICATIONS

This application is a continuation of International Patent Application Number PCT/EP2020/055871 filed Mar. 5, 2020, which claims priority to German Patent Application Number DE 10 2019 105 971.2 filed Mar. 8, 2019, the contents of which are incorporated herein by reference in their entireties.

BACKGROUND

The present invention relates to a cable drum unit for a crane on whose drum a supply line is wound that can be connected to a supply connection of the crane. The invention further also relates to a crane, preferably in the form of a mobile fast-erecting crane, having at least one supply connection to which a supply line such as a power cable can be connected and having a cable drum unit whose supply line is connected to the supply connection.

In cranes such as fast-erecting cranes, revolving tower crane, or other construction cranes, it is customary to supply electrical units from a power supply system or optionally also from a central construction site generator. Such electrical units can, on the one hand, be electrical actuating drives and actuators such as electric motors for traveling crane elements, for example a trolley drive, a hoist rope drive, or a slewing gear drive. However, different auxiliary units can also be electrically operated at the crane, for example construction site floodlights that are attached to the tower or control and/or operating units such as displays that can be attached in the crane operator's cab. Depending on the crane type, other electrical units can also be fed from the power supply system or from another power connection at the construction site.

To be able to guide the power cable from the crane to the power supply connection, cable drum units can be provided at the crane on whose drum the power cable can be wound to be able to stow the cable for the transport and to be able to only unwind the cable length that is required at the construction site, with such cable drum units being able to be attached to the undercarriage, but also to the superstructure of the crane, or also optionally at the tower or at the boom, and being able to be driven by a motor to facilitate operation, cf., for example, DE 20 2008 003 913 U.

The drum in this process is frequently rotatably supported at the undercarriage or at the superstructure of the crane, with deflections means such as deflection pulleys being able to be attached in the run-off region of the drum to be able to unwind the cable in different directions and also to be able to suitably wind it up again.

Such cable drum unit are used at cranes in this process not only for the power supply, but media-conducting supply cables such as oil lines, water lines, compressed air lines, or generally fluid lines can also be wound onto such a cable drum and can be connected to the corresponding supply connection of the crane.

The unwinding of the supply cable from the rope drum is, however, frequently troublesome for the crane operator as the unwound length increases and in dependence on the course of the path to the mains supply socket so that the power system supply on the construction site is frequently not used at all. With laying paths that are not straight, for example, and that, for example lead around a corner or an edge of a building, it is often troublesome to unwind the supply line from the drum at the crane and simultaneously to pull it around the corner of the building.

Starting from this, it is the underlying object of the present invention to provide an improved crane and an improved cable dram unit for such a crane that avoid the disadvantages of the prior art, and further develop the latter in an advantageous manner. A simple, flexible handling of the supply line during laying should in particular be made possible without sacrificing or impairing a space saving stowing at the crane for the transport of the crane.

SUMMARY

In accordance with the invention, said object is achieved by a crane in accordance with claim 1 and by a cable drum unit in accordance with claim 18. Preferred embodiments of the invention are the subject of the dependent claims.

It is therefore proposed to configure the cable drum unit as travelable and to releasably fasten it to the crane to be able to release the cable drum from the crane, and to travel it in a simple manner together with the cable wound up on it to the required site. In accordance with the invention, the cable drum is rotatably supported at a drum bearing frame that has a chassis for traveling the cable drum on the ground and releasable support means shape matched to the drum mount of the crane for a releasable attachment of the cable drum to the drum mount of the crane. The user is hereby given the option of being able to unwind the cable from the cable drum rotatably supported at the cane or to selectively remove the cable drum from the crane and to travel it to a desired site with the chassis on the ground to, for example, lay the supply line not from the crane to power supply connection, but from the power supply connection to the crane. Due to the configuration of the cable drum unit as a trolley, the drum unit can also be simply traveled with long, heavy cables.

The support means for fastening the drum bearing frame to the drum mount of the crane can generally have different configurations. The support frame could, for example, be hooked in and/or latched at the drum mount, for example by means of a hook and eye connection, in a shaped matched manner together with the cable drum rotatably supported thereon. Alternatively or additionally, adjustable tensioning means, for example in the form of clamping levers and/or tensioning belts, can be provided at the support frame and/or at the drum mount to fixedly fasten the drum bearing frame to the drum mount.

In an advantageous further development of the invention, the drum mount at the crane can comprise a cabinet-like or drawer-like reception compartment into which the cable drum unit including the drum, drum bearing frame and chassis can be driven or pushed. Such a reception compartment can advantageously comprise a compartment bottom and side walls and optionally also a top, with one side of the reception compartment advantageously being open to be able to push the cable drum unit into the reception compartment from the side. Said compartment side is preferably formed as open down to the bottom to be able to drive or push the cable drum unit directly on the compartment bottom without having to move over a marginal web. The open compartment side can define an approximately upright compartment opening that is dimensioned sufficiently large in cross-section or in area to be able to push in the total cable drum unit.

Said reception compartment can be configured overall as cuboid or parallelepiped-shaped. Independently of this, the reception compartment can comprise five closed sides, including the bottom and top, with the insertion opening or the open compartment side optionally also being able to be closed by a cover or by a door, but optionally also being able to remain fully open.

The compartment dimensions are adapted to the external dimensions of the cable drum unit, in particular to the external dimensions that are defined by the drum bearing frame and the chassis fastened thereto. The compartment dimensions can advantageously be adapted to the external dimensions of the cable drum unit such that the cable drum unit can be received in the reception compartment with an exact fit and/or without clearance.

The cable drum unit, in particular its drum bearing frame and optionally the chassis arranged thereat, can advantageously be configured such that the cable drum unit clamps and/or tensions itself in said reception compartment under its own gravity.

The drum bearing frame can advantageously comprise a support section that is arranged together with a chassis axle of the chassis at the same side of the cable drum so that the chassis axle, said support section, and the axis of rotation of the cable drum together define a bearing triangle, with the support section of the chassis defining a spread that is a little larger than the height of the reception compartment, that is the spacing apart of the compartment bottom and the compartment top with bearing elements optionally respectively attached thereto, so that said spread can only be slightly rotated or tilted into the reception compartment, but would be too long if the spread is exactly perpendicular. The support section of the drum bearing frame can hereby tension itself with a chassis standing on the compartment base against the top of the reception compartment or against a bearing element optionally attached thereto when said support section of the drum bearing frame attempts to straighten up completely or to rotate into the perpendicular position under the weight of the cable drum.

The cable drum or its center of gravity relative to the contact point of the chassis on the reception compartment bottom has a layer arm due to said arrangement of the support section relative to the chassis and relative to the cable drum that attempts to pull the support section projecting slightly obliquely over the chassis or over the chassis axle even further over the chassis axle or toward the perpendicular through the chassis axis, whereby an independent clamping of the cable drum unit in said reception compartment can be achieved.

With a removed cable drum unit, that is when the latter has been removed from the crane and has been placed on the ground, said support section of the drum bearing frame can form a bottom support that enables a placing of the cable drum unit on the ground together with the chassis axle. Said support section together with the chassis axle or the at least one wheel supported thereat can in particular form a multipoint support and/or a ground support surface so that the cable drum unit stands on the ground and in so doing is supported in common by the at least one chassis axle and by the support section of the drum bearing frame.

Said chassis axle and the support section of the drum bearing frame can span a bearing area or a bearing triangle or rectangle or polygon over whose central section the axis of rotation of the drum extends, that is, when the cable drum unit is placed on the ground, the center of gravity of the cable drum extends approximately centrally over said contact surface that is formed by the chassis axle and the support section.

It the cable drum unit is looked at in a direction of view in parallel with the axis of rotation of the drum with a cable drum unit standing on the ground, the connection lines that pass from the axis of rotation of the drum through the chassis axle or into the ground contact point of the chassis, on the one hand, and through the ground contact point of said support section of the support frame, on the other hand, can at least approximately define an approximately isosceles triangle and/or can define two clock hands that extend in the range from approximately half past three to half past five, on the one hand, and half past six to half past eight, on the other hand, in particular approximately in the range from four to five o'clock, on the one hand, and seven to eight o'clock, on the other hand.

If the stowed position of the cable drum unit in the reception compartment of the crane is looked at, said clock hands can extend in the range from half past six to half past eight, on the one hand, and half past nine to half past eleven, on the other hand, in particular seven to eight o'clock, on the one hand, and ten to eleven thirty, on the other hand.

The stored position of the cable drum unit stowed in the reception compartment is therefore advantageously tilted by approximately 90° with respect to the position of the cable drum unit standing on the ground.

To achieve a secure clamping of the cable drum unit in the reception compartment of the crane and/or to enable an unhindered pushing in and taking out, the previously named spread, that is spanned from the support section of the drum bearing frame and the chassis, can be greater than the diameter of the cable drum so that the cable drum can be pushed into the reception compartment with clearance.

Said drum support unit can, in an advantageous further development of the invention, alternatively or additionally, advantageously comprise a handlebar and/or gripping section that can advantageously extend on one side of the cable drum that is oppositely disposed the chassis and/or the aforesaid support section. To enable an ergonomically favorable gripping and a stable travel of the cable drum unit with a low center of gravity, said gripping and/or handlebar section can extend spaced further apart from the axis of rotation of the cable drum unit than the chassis axle and/or than said support section. Said handlebar and/or handling section is hereby, on the one hand, sufficiently high to be able to be simply gripped by an operator and, on the other hand, the cable drum is as low as possible to achieve a low center of gravity.

Said handlebar and/or handling section of the drum bearing frame can in particular—when looking at the cable drum unit in the direction of the axis of rotation of the drum—define, together with the previously named support section and the contact point of the wheel of the chassis axle, a triangle whose connection side between the handlebar section and the chassis wheel at least approximately forms a tangent at the cable drum and whose connection side between the chassis wheel and the support section is arranged slanted at a slightly obtuse angle thereto, for example in the range from 100° to 120°. Such a constellation makes it possible that, on the one hand, the support section is tensioned against the reception compartment top in the aforesaid manner and, on the other hand, the handlebar and/or handling section lies on the compartment bottom or bounds the tensioning.

To be able to simply unwind the cable or the supply line from the cable drum or to wind it up thereon, when the cable drum unit is in the reception compartment at the crane or in the drum mount at the crane, a cable deflector can be provided, for example in the form of a deflection roll, of a deflection roll pair, or of a deflection roll group, or also of a split slip ring, with said cable deflector advantageously being positioned such that it is disposed opposite the contact surface defined by the chassis and the support section of the drum bearing frame. The cable deflector can in particular be positioned at the side of the reception compartment that forms an upright compartment side and is disposed opposite the chassis and the support section of the drum bearing frame.

Said cable deflector can advantageously have two pairs of deflection rolls that are each rotatably supported and that can comprise one lying roll pair arranged above one another and one standing roll pair arranged next to one another.

To facilitate the winding up and unwinding of the supply line, a drive apparatus can be assigned to the drive device to rotationally drive the cable drum. In the most simple design, it can be a manually operable crank drive having a crank handle.

Alternatively or additionally, said drum drive can advantageously comprise a drive motor, for example an electric motor that can be engaged, with the drive motor advantageously having a reversible drive direction or direction of rotation. Alternatively or additionally, a transmission can also be interposed that is reversible in the drive direction to both be able to wind up the supply line and to unwind it with motor assistance.

Alternatively or additionally, a spring drive and/or a pressure store drive can also be provided that can assist the winding up or the unwinding of the supply line. The supply line can in particular be unwound from the cable drum against the preload of the spring or of the pressure store so that the preload device tensions on the unwinding of the cable. To roll up the cable again, the preload device can rotationally drive the drum to wind up the cable.

Alternatively or additionally, the drum drive can also be coupled with at least one wheel of the chassis to automatically rotationally drive the cable drum on the traveling of the cable drum unit on the ground. A step-up or step-down gear can in particular be provided between the chassis wheel and the cable drum that derives a rotational movement of the cable drum from a wheel revolution, with the step-up or step-down gear advantageously being able to be selected such that the cable length wound off the drum or the cable length wound up approximately corresponds to the distance covered by the chassis wheel. The cable or the supply line can hereby be harmoniously unwound and wound up without excessive slackline or excessive pull of the rope resulting. Tangled wires can hereby be avoided.

The at least one chassis wheel can advantageously have pneumatic tires to provide high travel comfort. Two chassis wheels can advantageously be provided to achieve a stable support, with the two chassis wheels advantageously being able to comprise pneumatic tires of sufficient diameter. Alternatively, an inherently stable tire configured as resilient would also be conceivable, for example in the form of solid tires or fiber reinforced jacket tires.

The chassis advantageously comprises only one chassis axle, but with more than one chassis axle also being possible.

The supply line can advantageously have a respective connection plug at both ends to be able both to plug in or connect the supply line easily at the crane and to be able to connect it to a supply network. If the supply line is a power cable, said connection plugs can be electrical pole plugs. If the supply line is a fluid line, said connection plugs can be fluid couplings.

BRIEF DESCRIPTION OF THE DRAWINGS

The invention will be explained in more detail in the following with reference to a preferred embodiment and to associated drawings. There are shown in the drawings.

DETAILED DESCRIPTION

Figure 1:
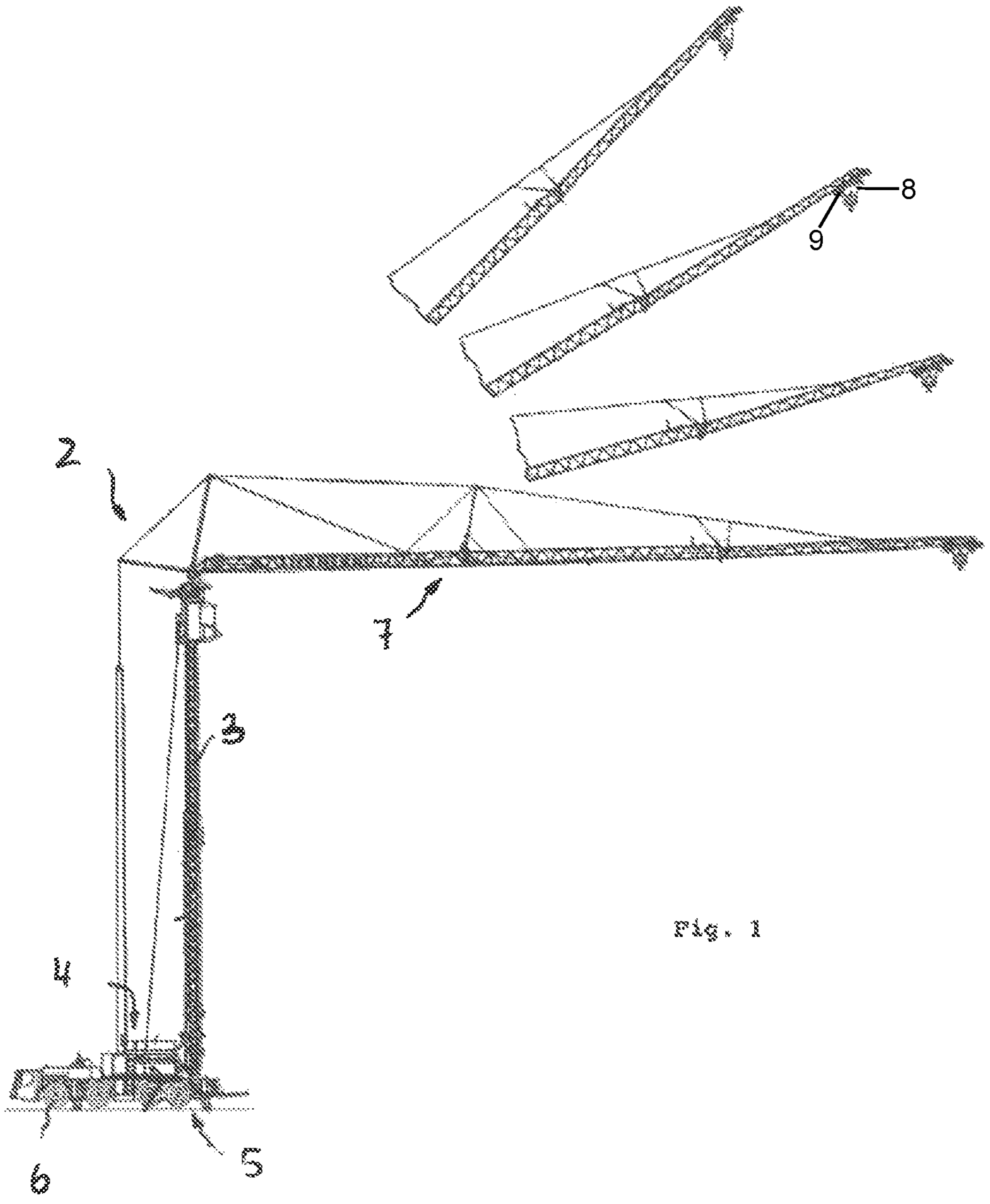
FIG. 1: a schematic side view of a crane in the form of a mobile fast-erecting crane at whose undercarriage a reception compartment for a cable drum unit is provided.

The cable drum unit 1 shown in the Figures can form a crane equipping part for a mobile fast-erecting crane such as is shown in FIG. 1, but with the cable drum unit 1 also being able to be used for different crane types such as a revolving tower crane or a mobile telescopic boom crane or another construction crane.

As FIG. 1 shows, the crane 2 can comprise a tower 3 that can be supported on a slewing deck 4 that is seated on an undercarriage 5 and can be rotated about an upright axis of rotation by means of a slewing gear drive. Said undercarriage 5 can be travelably configured as a truck or in another manner and can comprise a crane chassis 6 that can be configured as multiaxial and can have at least one driven axle. The crane 2 can, however, optionally also have a fixedly anchored or supported support base.

Said tower 3 can be telescopic and/or downwardly luffable to be able to be moved around a horizontal transport position. In its upright operating position, the tower 3 supports a boom 7 that can optionally be moved in different luffing positions, as FIG. 1 shows. A hoist rope 8 having a load hook fastened thereto can be let down from the boom 7 and can be raised by means of a hoisting gear drive. The hoist rope 8 can optionally run off over a trolley 9 that can be traveled at the boom 7 by means of a trolley travel drive.

The crane 2 can have different electrical units, as initially explained.

Figure 2:
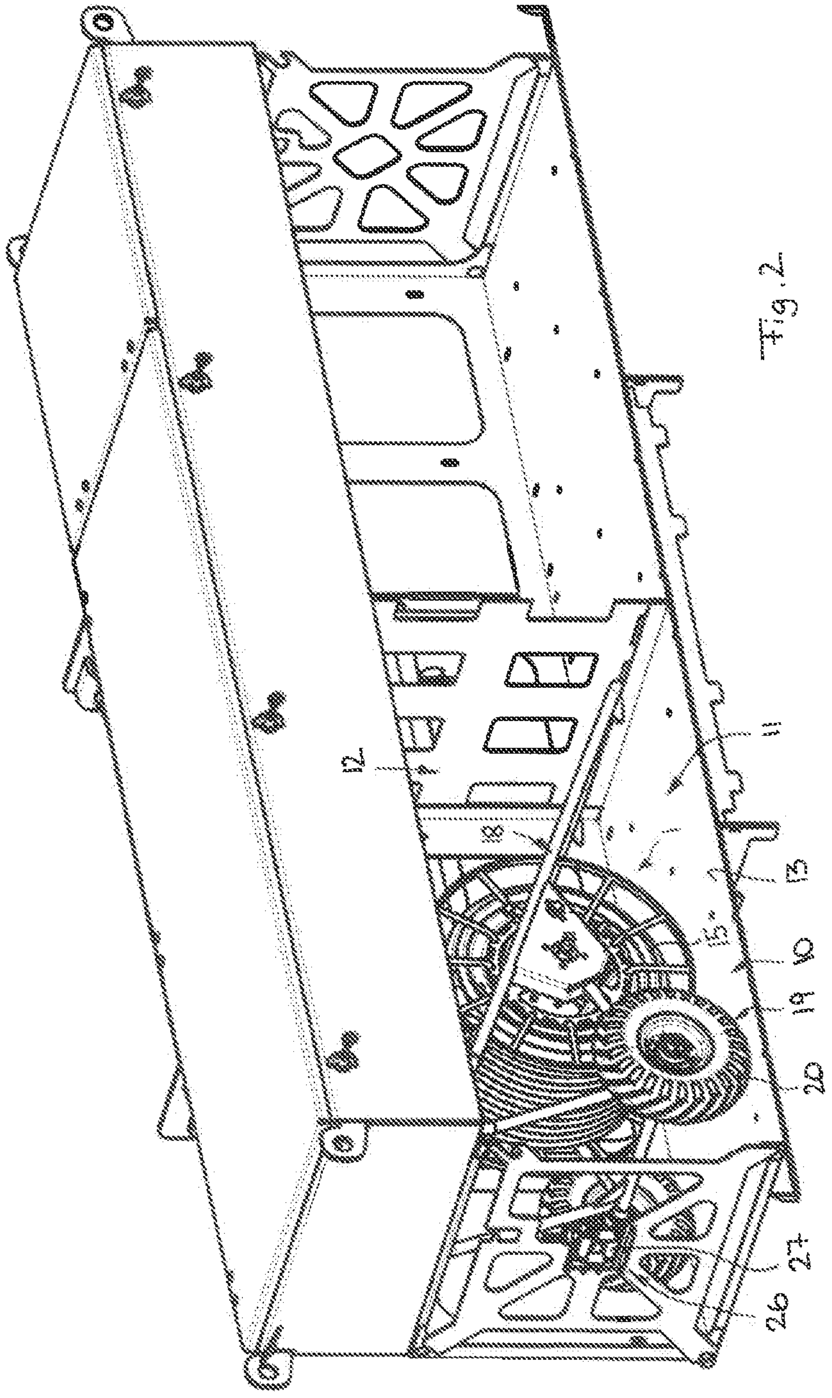
FIG. 2: a perspective representation of the reception compartment of the mobile crane of FIG. 1 and of the cable drum unit received therein.
Figure 3:
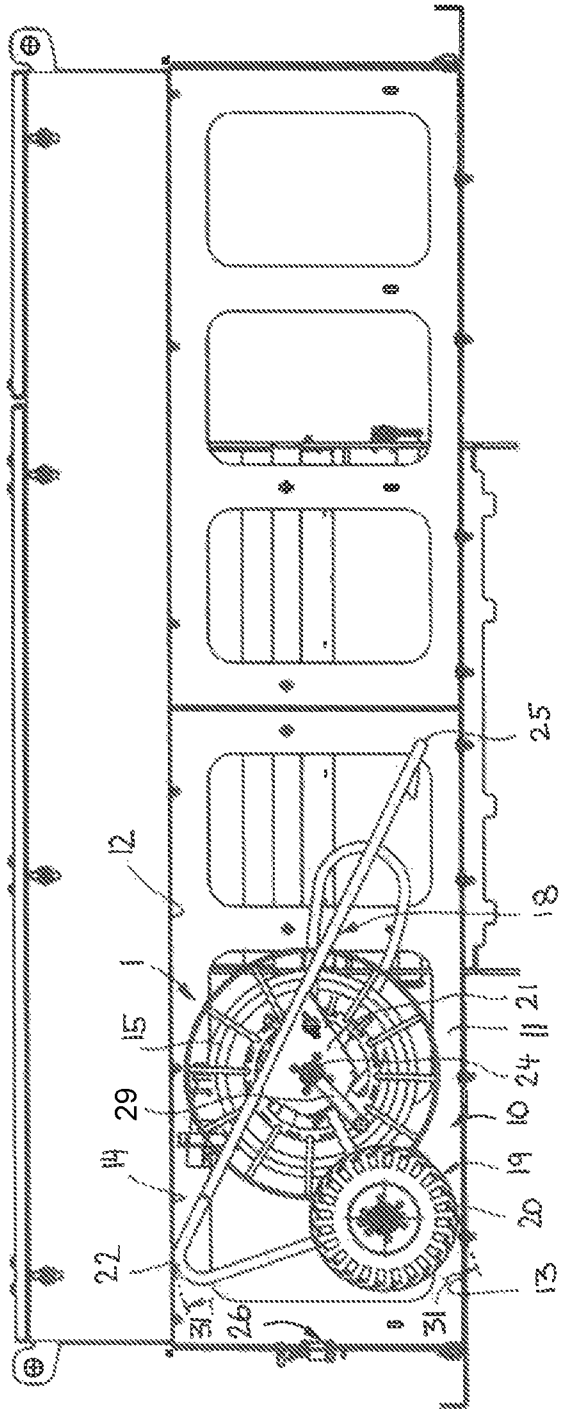
FIG. 3: a plan view of the cable drum unit that is stowed in the reception compartment of the crane and is seated, in particular tensioned, fit without clearance between its compartment bottom and compartment top.

As FIGS. 2 and 3 show, a drum mount 10 is provided at the undercarriage 5 of the crane 2 to receive the cable drum unit 1, with said drum mount 10 in particular being able to comprise a reception compartment 11 in which the cable drum unit 1 can be stowed, in particular pushed or driven in, cf. FIGS. 2 and 3.

Said reception compartment 11 can be adapted to the external dimensions of the cable drum unit 1, with the reception compartment 11 being dimensioned sufficiently large to be able to receive the cable drum unit 1 in its totality. On the other hand, the reception compartment 11 is only formed as so large or so small that the cable drum unit 1 can then be fit or can be clamped thereto without clearance.

Figure 4:
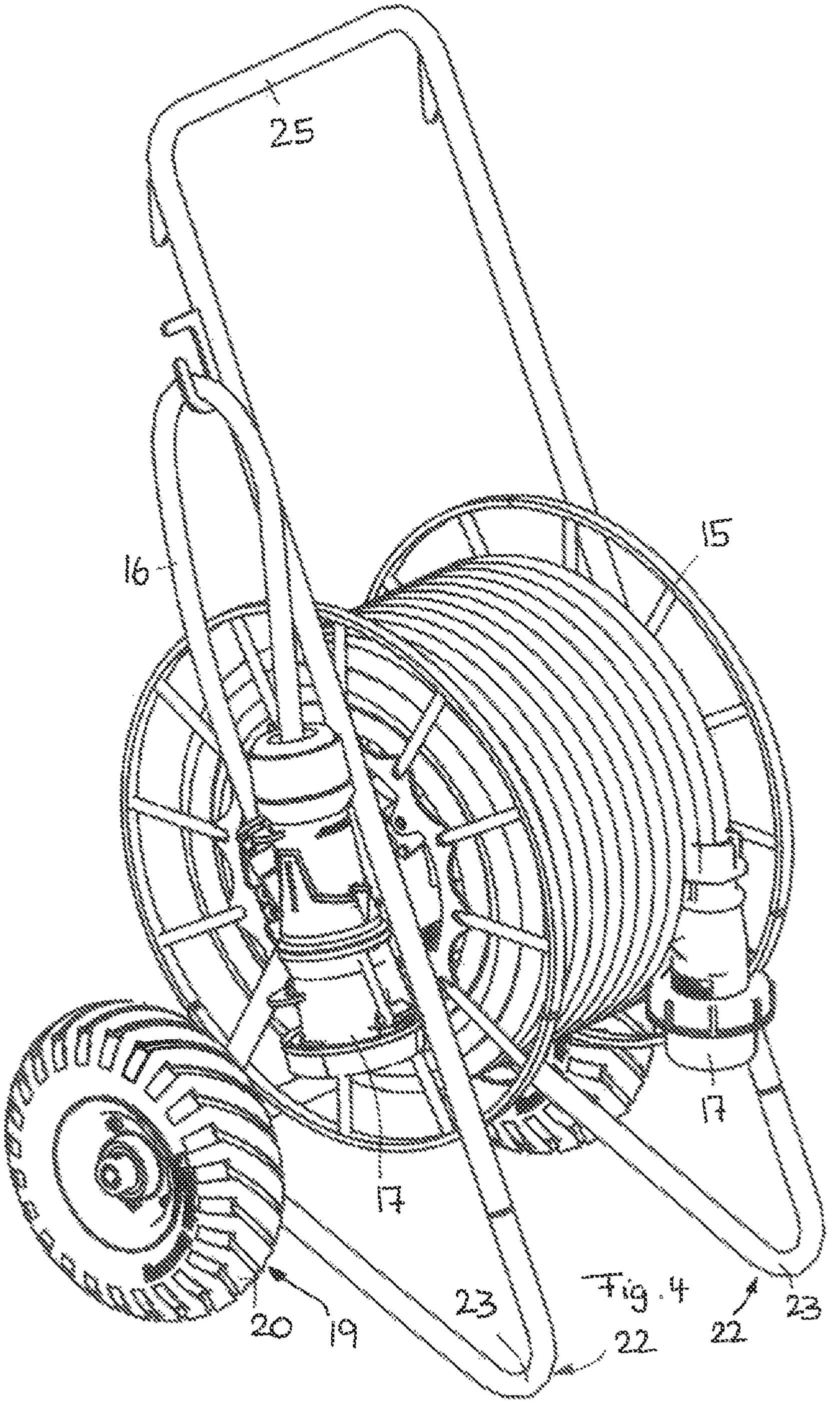
FIG. 4: a perspective frontal view of the cable drum unit removed from the crane in a state placed on the ground.

Said reception compartment 11 can be configured to receive the cable drum unit 1 in a lying orientation that is tilted by approximately 90° with respect to the travel position placed on the ground, cf. comparison FIG. 3 in comparison with FIG. 4.

Said reception compartment 11 can be configured as parallelepiped-shaped overall and can have an open longitudinal side through which the cable drum unit 1 can be traveled into the reception compartment 11, with said side opening 12 being able to take up the whole compartment side or being able to extend down to the compartment bottom 13 to be able to simply push in the cable drum unit 1. A cover not shown in FIG. 2 or a door can close the side opening 12.

Figure 5:
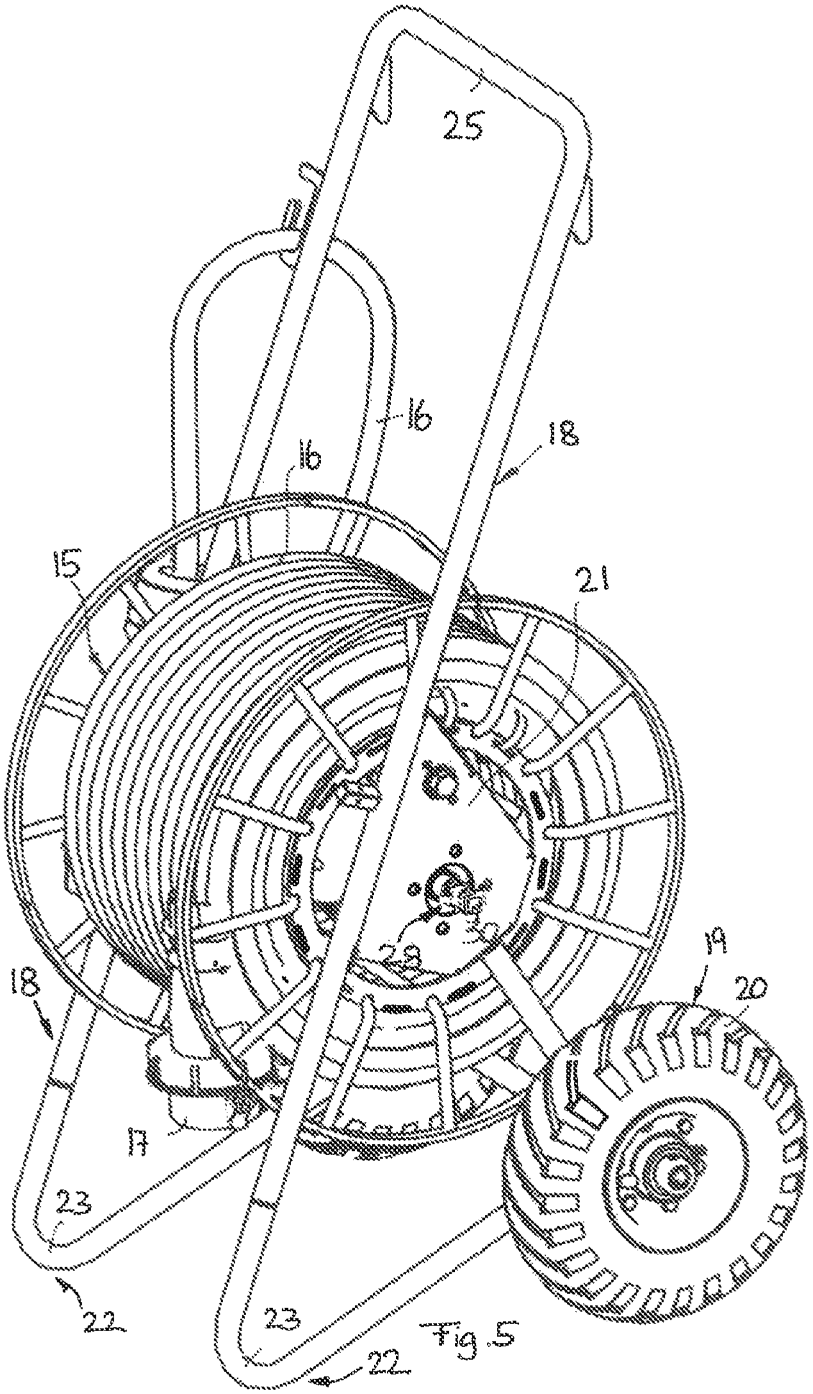
FIG. 5: a perspective representation of the cable drum unit similar to FIG. 4 that shows the drive shaft for the rotating drive of the drum.

As FIGS. 4 and 5 show, the cable drum unit 1 comprises a cable drum 15 for winding up and unwinding a supply line 16 that can be provided with a connection plug 17 at its two ends to connect the supply line 16 to the crane 2, on the one hand, and to a supply system or a supply source, on the other hand.

The cable drum 15 is here rotatably supported at a drum bearing frame 18 to which a chassis 19 is attached so that the cable drum unit 1 forms a trolley and is travelable at the ground. Said chassis 19 can advantageously be formed monoaxially and comprise two pneumatic-tired wheels 20 whose track width can advantageously exceed the widths of the cable drum 16 to make possible a stabile support and a compact construction.

The drum bearing frame 18 can have a central bearing section 21 at which the cable drum 15 is rotatably borne.

Said chassis 19 can be supported by two chassis struts with respect to said bearing section 21, cf. FIG. 5.

The drum bearing frame 18 advantageously furthermore comprises a support section 22 that can bear the cable drum unit 1 at the ground when the chassis 19 of the cable drum unit 1 stands on the ground, cf. FIG. 4 and FIG. 5. Said support section 22 can here be formed by two support arms 23 that can be supported at the chassis 19 and/or at the central bearing section 21, with the two support arms 23 being able to comprise, for example, two support sides bent in V shape that are supported at the central bearing section 21, on the one hand, and at the chassis 19, on the other hand, and that project from the chassis 19 toward one side of the cable drum 15, cf. FIGS. 4 and 5.

If the cable drum unit 1 is observed in the direction of the axis of rotation 24 of the cable drum 15, the wheels 20 of the chassis 19 and of said support section 22 of the drum bearing frame 18 are arranged on the same side of the cable drum 25, but spaced apart from one another here so that the wheels 20, the support section 22 and the axis of rotation 24 of the drum form a triangle. The axis of rotation 24 and thus the center of gravity of the cable drum 15 in particular approximately extend centrally above the ground contact surface or the ground contact points that are defined by the wheels 20, on the one hand, and by the support section 22, in particular the support arms 23, on the other hand. The cable drum unit 1 hereby stands on the ground in a stable form when it is not traveled. The support section 22 and the wheel or wheels 20 of the chassis 19 can define a spread 31.

The support arms 23 in the embodiment drawn form support blades or runners that stand on the ground when the cable drum unit 1 is not traveled. Alternatively, said support sections 22 or the support arms 23 could, however, also bear a further chassis axle having further wheels to support the cable drum unit 1 on two mutually spaced apart chassis axles.

As FIGS. 4 and 5 show, the drum bearing frame 18 further comprises a handlebar 25 that is arranged at an oppositely disposed side of the cable drum 15 with respect to the wheels 20 and the support arms 23 and can be rigidly connected to the central bearing section 21. The handlebar 25 can in particular be formed by a handlebar hoop that is U-shaped overall and that projects obliquely upwardly from the central bearing section 21 at both sides of the cable drum 15.

If the cable drum unit 1, as shown in FIGS. 4 and 5, on the chassis 19 and optionally on the support arms 23 stands on the ground, said handlebar 25 extends above the cable drum 15 approximately at the stomach level or chest level of an operator to be able to simply travel the unit. The handlebar 25 can advantageously extend in the alignment standing on the ground, as is shown in FIGS. 4 and 5, together with the wheels 20 toward one side of the cable drum 15 so that an imaginary connection line between the handlebar 25 and the wheels 20 can approximately form a tangent at the cable drum 15.

Due to the geometry, in particular the positioning and spacing of the support arms 23, of the chassis axle of the chassis 19, and of the handlebar 25, the center of gravity of the cable drum 15 in the state supported on the ground, in which the support arms 23 also contact the ground, is disposed, viewed from the handlebar 25, slightly in front of the wheels 20 or slightly in front of the chassis axle so that the weight of the cable drum 15 attempts to tilt the unit slightly forward with respect to the chassis 19 and some of the weight rests on the support arms 23. If, however, the drum bearing frame 18 tilts slightly rearwardly at the handlebar 25 so that the support arms 23 rise from the ground, the center of gravity of the cable drum 15 moves approximately perpendicular above the chassis axle of the chassis 19 so that the greater portion of the drum weight rests on the chassis 19 and the operator does not have to apply any high forces.

As in particular FIG. 3 shows, the geometry of the drum bearing frame 18 is adapted to the reception compartment 11 such that the cable drum unit 1 fits into the reception compartment 11 with an exact fit when lying. In this process, the support section 22 and/or the support arms 23 can extend from the chassis 19, when it stands on the compartment bottom 13, slightly obliquely away from the cable drum 15 upward to the cover 14 of the reception compartment 11 and can abut it. Since the center of gravity of the cable drum 15 is not above the chassis axle 9, but rather spaced apart therefrom, the drum bearing frame 18 rotates for so long until the support section 22, in particular the support arms 23, abut the top 14 and/or the handlebar 25 at the compartment bottom 13 so that the drum bearing frame 18 tensions in the reception compartment 11, at least contacts it without clearance.

Further fastening means can be provided for securing, for example latching elements such as latching clips that latch the handlebar 25 and into which the handlebar 25 can be clipped. Alternatively or additionally, tensioning elements such as tensioning belts or tensioning levers or clips, or also adjustable fastening elements such as screw clips can be provided to also hold the cable drum unit 1 securely in the drum mount 10 in a travel operation subject to shocks.

As FIG. 2 shows, a cable deflector 26 can be provided at the crane 2, in particular at the crane mount 10, that can advantageously extend at a position that faces the chassis 19 and/or the support arms 23 in the position fastened to the crane. The cable deflector 26 can in particular be arranged at a reception compartment side of the reception compartment 11 that faces the chassis 19 and the support frame 23.

The cable deflector 26 can, for example, comprise a plurality of deflection pulleys 27 that can be arranged pair-wise spaced apart from one another in upright and horizontal positions to be able to deflect the cable to be unwound in different directions.

The cable drum 15 can be rotated relative to the drum bearing frame 18 by a drum drive 28. As FIGS. 3 and 5 show, such a drum drive 28 can, for example, comprise a crank handle 29 that can be rotationally fixedly fastenable to a drum shaft 30.

Alternatively or additionally, the drum drive 28 can also comprise a coupling of the drum shaft 30 with one or both wheels 20 of the chassis 19. The drum drive 28 can, for example, comprise a chain drive or a belt drive, with a drive pinion or a drive plate being able to rotationally fixedly fastened to the drum shaft 30 and with a second drive pinion or drive plate being able to be rotationally fixedly fastened to one of the wheels 20. The two pinions or the two drum plates are here advantageously coordinated with one another with respect to their revolution diameters such that the cable drum 15 rotates so fast on the travel of the cable drum while rotating the wheels 20 that the distance covered by the chassis 19 approximately corresponds to the cable length unwound or wound up.

We claim:

1. A crane having at least one supply connection to which a supply line is connectable, wherein the supply line is windable onto a cable drum that is fastenable to a drum mount of the crane, wherein the cable drum is rotatably supported at a drum bearing frame that has a chassis for moving the cable drum on the ground, and wherein the drum bearing frame is releasably attachable to the drum mount with a shape-matched connection, wherein the drum mount has a reception compartment that has a compartment opening through which the cable drum is pushable into the reception compartment together with the drum bearing frame and the chassis, wherein a cable drum unit is receivable by the reception compartment when the cable drum unit is in a horizontal stowing orientation that is tilted by approximately 90° with respect to a travel orientation standing on the ground, wherein the cable drum unit comprises the supply line, the cable drum, and the drum bearing frame, and wherein the reception compartment has a height that is smaller than a longitudinal extent of the reception compartment or less than 75° of the longitudinal extent of the reception compartment.

2. The crane of claim 1, wherein the drum bearing frame is insertable into the drum mount with an exact fit.

3. The crane of claim 2, wherein the chassis and the drum bearing frame are spreadable or tensionable by a weight force of the cable drum at the drum mount.

4. The crane of claim 1, wherein the drum bearing frame has a support section comprising two support arms that are spaced apart from one another, the support section forming a ground contact surface or mutually spaced apart ground contact points together with the chassis and extending on a side of the cable drum together with the chassis, the support section and an axis of rotation of the cable drum forming a triangle when viewing the cable drum in the direction of the axis of rotation, and wherein the axis of rotation extends above the chassis and the support section in a state supported on the ground between the chassis and the support section.

5. The crane of claim 1, wherein the drum bearing frame has a handlebar that extends on an oppositely disposed side of the cable drum relative to the chassis.

6. The crane of claim 5, wherein the handlebar and the chassis are offset toward the same side of the cable drum relative to an axis of rotation of the cable drum such that a connection line between the handlebar and the chassis forms a tangent at the cable drum.

7. The crane of claim 5, wherein the drum bearing frame has a central bearing section at which the cable drum is rotatably supported and at which the chassis, support arms, and the handlebar are rigidly supported.

8. The crane of claim 1, wherein the cable drum is rotatable with respect to the drum bearing frame via a drum drive.

9. The crane of claim 8, wherein the drum drive has a crank handle.

10. The crane of claim 1, wherein the supply line has a respective plug-in coupling at its two ends for coupling to the at least one supply connection of the crane, on the one hand, and for coupling to a mains supply connection, on the other hand.

11. The crane of claim 1, wherein an undercarriage comprising a crane chassis bears a slewing platform that is rotatable about an upright axis and at which a tower and/or a boom is arranged, and wherein a hoist rope runs off the boom.

12. The crane of claim 11, wherein the drum mount is provided at the undercarriage.

13. The crane of claim 1, wherein the crane comprises a mobile fast-erecting crane.

14. The crane of claim 1, wherein the supply line comprises a power cable.

15. The crane of claim 1, wherein the reception compartment is parallelepiped-shaped, with the compartment opening extending flush up to a compartment bottom and forming an upright side opening of the reception compartment.

16. A crane comprising:

a reception compartment; and at least one supply connection to which a supply line is connectable, wherein the supply line is windable onto a cable drum that is fastenable to a drum mount of the crane, wherein the cable drum is rotatably supported at a drum bearing frame that has a chassis for moving the cable drum on the ground, and wherein the drum bearing frame is releasably attachable to the drum mount with a shape-matched connection, wherein the drum bearing frame has a support section comprising two support arms that are spaced apart from one another, the support section forming a ground contact surface or mutually spaced apart ground contact points together with the chassis and extending on a side of the cable drum together with the chassis, the support section and an axis of rotation of the cable drum forming a triangle when viewing the cable drum in the direction of the axis of rotation, and wherein the axis of rotation extends above the chassis and the support section in a state supported on the ground between the chassis and the support section, wherein the reception compartment has a height, and wherein the support section and a wheel or wheels of the chassis define a spread that is larger than the height of the reception compartment and that fits with an exact fit between a compartment bottom and a top of the reception compartment in a position of the spread tilted at an acute angle with respect to the vertical.

17. The crane of claim 16, wherein the reception compartment has a compartment opening through which the cable drum is pushable into the reception compartment together with the drum bearing frame and the chassis.

18. The crane of claim 17, wherein the reception compartment is parallelepiped-shaped, with the compartment opening extending flush up to a compartment bottom and forming an upright side opening of the reception compartment.

19. The crane of claim 17, wherein a cable drum unit is receivable by the reception compartment when the cable drum unit is in a horizontal stowing orientation that is tilted by approximately 90° with respect to a travel orientation standing on the ground, wherein the cable drum unit comprises the supply line, the cable drum, and the drum bearing frame, and wherein the height of the reception compartment is smaller than a longitudinal extent of the reception compartment or less than 75° of the longitudinal extent of the reception compartment.

* * * * *